(12) United States Patent
Yasui et al.

(10) Patent No.: US 10,742,827 B2
(45) Date of Patent: Aug. 11, 2020

(54) IMAGE FORMING APPARATUS, OPERATION METHOD AND STORING SHEET INFORMATION FOR IMAGE ADJUSTMENT

(71) Applicant: TOSHIBA TEC KABUSHIKI KAISHA, Tokyo (JP)

(72) Inventors: Kazumasa Yasui, Arakawa Tokyo (JP); Tomokazu Sakabe, Mishima Shizuoka (JP); Eizo Kurita, Sunto Shizuoka (JP); Kyosuke Terada, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/353,803

(22) Filed: Mar. 14, 2019

(65) Prior Publication Data

US 2020/0021705 A1    Jan. 16, 2020

(30) Foreign Application Priority Data

Jul. 13, 2018 (JP) .................................. 2018-133359

(51) Int. Cl.
*H04N 1/00* (2006.01)
*H04N 1/60* (2006.01)

(52) U.S. Cl.
CPC ..... *H04N 1/00761* (2013.01); *H04N 1/00702* (2013.01); *H04N 1/00708* (2013.01); *H04N 1/6033* (2013.01)

(58) Field of Classification Search
CPC .......... H04N 1/00761; H04N 1/00708; H04N 1/00702; H04N 1/6033

USPC ......................................................... 358/1.5
See application file for complete search history.

(56) References Cited

U.S. PATENT DOCUMENTS

| 6,480,688 | B1 | 11/2002 | Yasui | |
|---|---|---|---|---|
| 10,185,264 | B2 | 1/2019 | Yasui | |
| 2009/0092404 | A1* | 4/2009 | Tashiro | B41J 11/003 399/38 |
| 2010/0103460 | A1* | 4/2010 | Murayama | G06F 3/1205 358/1.15 |
| 2011/0292411 | A1* | 12/2011 | Cortes | G03G 15/5029 358/1.9 |

(Continued)

FOREIGN PATENT DOCUMENTS

JP    4460269 B2    5/2010

*Primary Examiner* — Allen H Nguyen
(74) *Attorney, Agent, or Firm* — Kim & Stewart LLP

(57) ABSTRACT

An image forming apparatus includes a scanner, a printer configured to print an image based on an image read by the scanner, a memory, and a processor. The processor is configured to control the printer to print an adjustment test pattern on a first sheet, and the scanner to scan the adjustment test pattern on the first sheet, determine a setting value for adjusting positioning of an image to be printed by the printer on a sheet of the first sheet size, such that an image center matches a sheet center in a main scanning direction and a sub-scanning direction, and store the determined setting value in the memory. The processor is configured to modify the setting value stored in the memory based on sheet information related to a second sheet to be used for printing, the second sheet having a second sheet size different from the first sheet size.

18 Claims, 10 Drawing Sheets

(56) References Cited

U.S. PATENT DOCUMENTS

| | | | |
|---|---|---|---|
| 2012/0154837 A1* | 6/2012 | Yamazaki | H04N 1/4076 |
| | | | 358/1.9 |
| 2013/0064580 A1* | 3/2013 | Igarashi | G03G 15/0189 |
| | | | 399/301 |
| 2015/0185674 A1* | 7/2015 | Iwashima | G03G 15/5062 |
| | | | 399/16 |
| 2017/0104887 A1* | 4/2017 | Nomura | H04N 1/00355 |
| 2017/0346975 A1* | 11/2017 | Sakai | H04N 1/00708 |

\* cited by examiner

IMAGE FORMING APPARATUS, OPERATION METHOD AND STORING SHEET INFORMATION FOR IMAGE ADJUSTMENT

CROSS-REFERENCE TO RELATED APPLICATION

This application is based upon and claims the benefit of priority from Japanese Patent Application No. 2018-133359, filed Jul. 13, 2018, the entire contents of which are incorporated herein by reference.

FIELD

Embodiments described herein relate generally to an image forming apparatus.

BACKGROUND

A conventional image forming apparatus such as a digital MFP (multi-functional peripheral) adjusts a position of an image using a predetermined image pattern. However, since a precise size of a sheet actually used is not necessarily constant even if it is a fixed size sheet, it may be necessary to perform an image adjustment again. The precise size of the sheet may vary depending on manufacturer of sheets even if the sheets are indicated as the same size, and may also vary depending on humidity or the like. For this reason, it is difficult for the image forming apparatus to carry out image adjustment suitable for sheets that are to be actually used, during a manufacturing process. The sheet used by the image forming apparatus for printing may shrink due to heat applied to the sheet in a fixing processing or the like. Therefore, in such an image forming apparatus, it may be difficult to carry out the image adjustment in consideration of a change in the size of the sheet due to the fixing processing.

DETAILED DESCRIPTION

According to an embodiment, an image forming apparatus includes a scanner, a printer configured to print an image based on an image read by the scanner, a memory, and a processor. The processor is configured to control the printer to print an adjustment test pattern on a first sheet, and the scanner to scan the adjustment test pattern on the first sheet, determine a setting value for adjusting positioning of an image to be printed by the printer on a sheet of the first sheet size, such that an image center matches a sheet center in a main scanning direction and a sub-scanning direction, and store the determined setting value in the memory. The processor is configured to modify the setting value stored in the memory based on sheet information related to a second sheet to be used for printing, the second sheet having a second sheet size different from the first sheet size.

Hereinafter, an embodiment is described with reference to the accompanying drawings.

First, a configuration of a digital MFP 1 as an image forming apparatus according to an embodiment is described.

Figure 1:
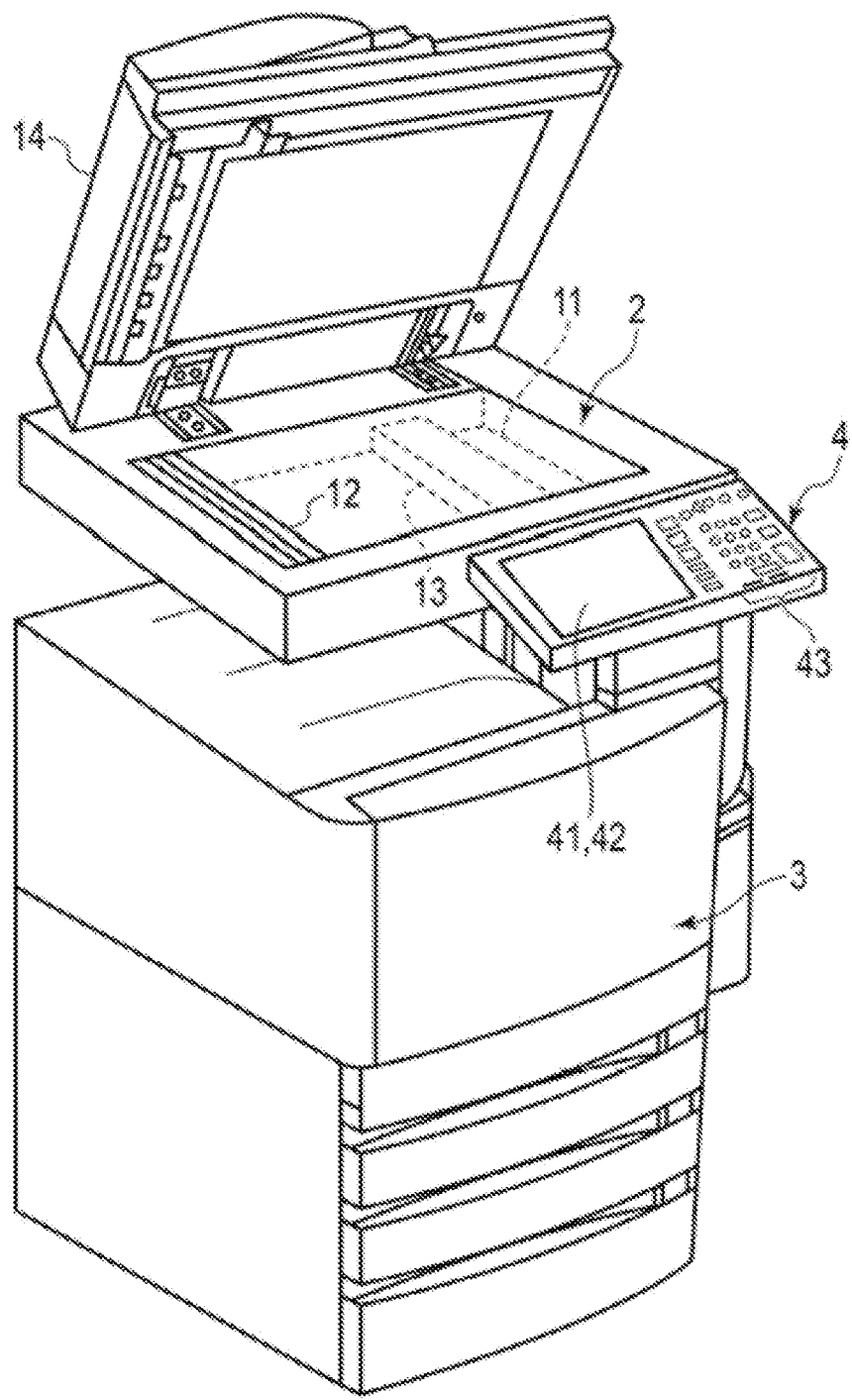
FIG. 1 illustrates an external view of an example of a digital MFP as an image forming apparatus according to an embodiment.
Figure 2:
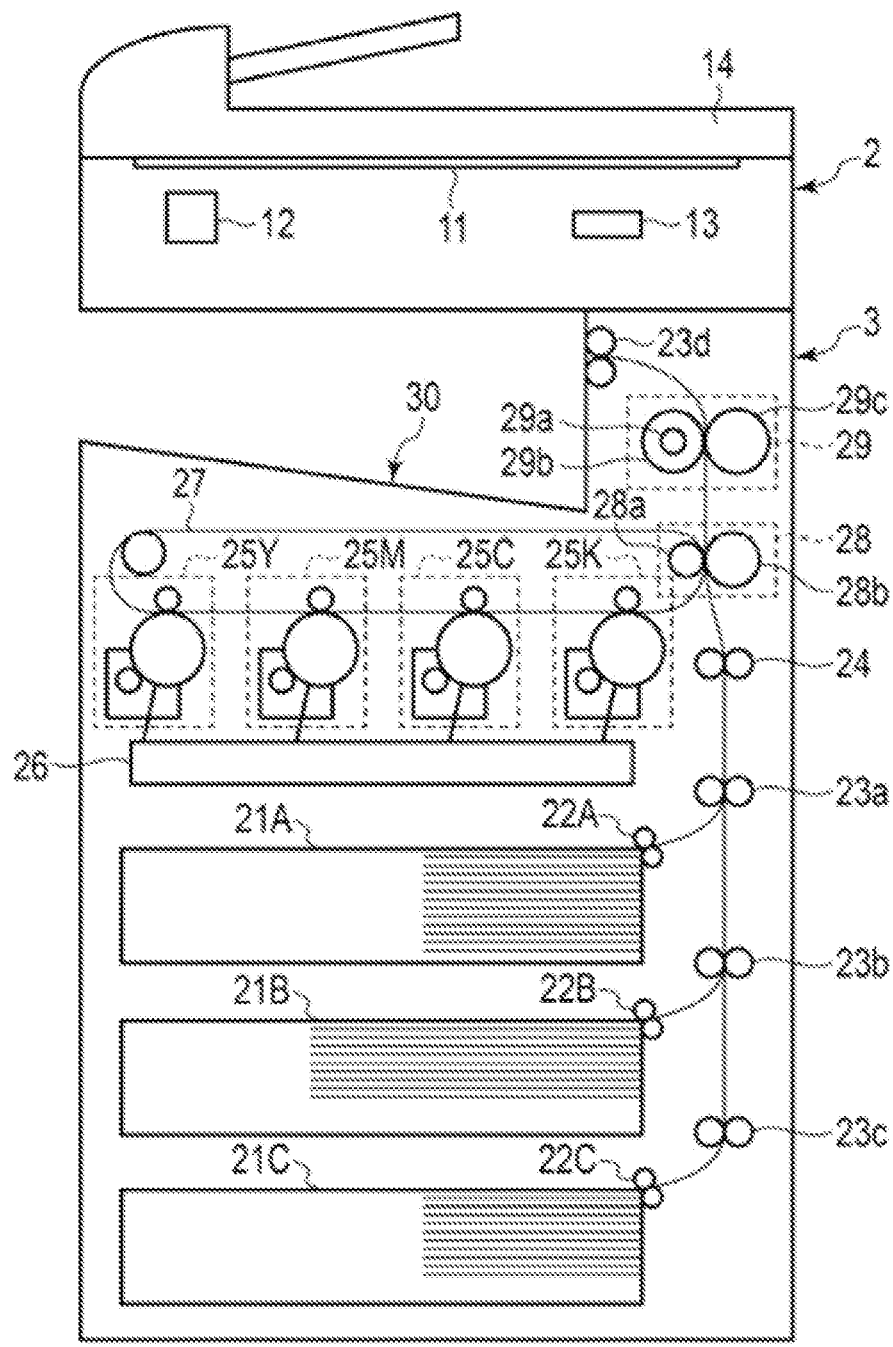
FIG. 2 illustrates a cross-sectional view of an example of the digital MFP as the image forming apparatus according to the embodiment.

FIG. 1 illustrates a perspective view of an example of a digital MFP 1 as the image forming apparatus according to the embodiment. FIG. 2 illustrates a cross-sectional view of an example of the digital MFP 1.

As shown in FIG. 1, the digital MFP 1 includes a scanner 2, a printer 3, and an operation panel 4.

The scanner 2 is provided at an upper part of a main body of the digital MFP 1. The scanner 2 optically reads an image on a document. The scanner 2 has a document table glass 11 on which a document to be scanned is placed. The scanner 2 has an image reading mechanism that scans the document on the document table glass 11 via a glass of the document table glass 11.

The scanner 2 has a carriage 12 and a photoelectric conversion section 13. The carriage 12 and the photoelectric conversion section 13 are provided below the document table glass 11. The carriage 12 includes an illumination 62 (refer to FIG. 3) and an optical system such as a mirror. The illumination 62 is provided in the carriage 12 to irradiate a reading position on the document table glass 11 with light. The reading position on the document table glass 11 irradiated by the illumination 62 with the light is an image corresponding to one line (or a plurality of lines) in a main scanning direction. The optical system such as a mirror provided in the carriage 12 guides a light (reflected light) from the reading position irradiated by the illumination 62 to the photoelectric conversion section 13.

The carriage 12 is moved in a sub-scanning direction below the document table glass 11 by a movement mechanism 63 (refer to FIG. 3) including a stepping motor or the like. A position of the carriage 12 is determined in an initial operation, and the movement thereof in the sub-scanning direction is controlled based on the determined position. For example, the carriage 12 is moved in the sub-scanning direction to continuously guide an image of each line in the main scanning direction in a document reading area on the document table glass 11 where the document is placed to the photoelectric conversion section 13.

The photoelectric conversion section 13 has a lens, a photoelectric conversion sensor, and a cover. The lens condenses the light guided by the optical system of the carriage 12 to guide the light to the photoelectric conversion sensor. The photoelectric conversion sensor includes photoelectric conversion elements. The photoelectric conversion sensor is, for example, a line sensor in which CCDs (Charge Coupled Devices) or CISs (Contact Image Sensors) as photoelectric conversion elements are arranged in a line. The line sensor as the photoelectric conversion sensor converts the image corresponding to one line in the main scanning direction (reflected light by a document surface) into pixel data corresponding to one line.

The carriage 12 includes an exposure lamp and an optical system such as a mirror, and is moved below the document table glass 11 in the sub-scanning direction. The carriage 12 moves the reading position on the document table glass 11 leading to the photoelectric conversion section 13 in the sub-scanning direction. Specifically, the scanner 2 adjusts the reading of the image in the sub-scanning direction by controlling the movement of the carriage 12. The scanner 2 reads the image of the entire document by acquiring the image data in the main scanning direction converted by the photoelectric conversion section 13 while moving the carriage 12 in the sub-scanning direction.

The scanner 2 has an ADF (Automatic Document Feeder) 14. The ADF 14 also functions as a document table cover and is provided in an openable manner. When the ADF 14 is closed, the ADF 14 covers the entire document reading area on the document table glass 11. The ADF 14 includes a sheet feed tray and a conveyance system. The sheet feed tray of the ADF 14 holds a document to be read. The conveyance system of the ADF 14 picks up the documents set in the sheet feed tray one by one to convey them so that a reading surface of each document taken out passes through a predetermined reading position.

The printer 3 has sheet feed cassettes 21A, 21B, and 21C. Each of the sheet feed cassettes 21A, 21B, and 21C accommodates a sheet as an image forming medium on which an image is to be printed. For example, each of the sheet feed cassettes 21A, 21B, and 21C is detachable from the lower part of a main body of the digital MFP. The sheet feed cassettes 21A, 21B, and 21C have sheet feed rollers 22A, 22B, and 22C, respectively. The sheet feed rollers 22A, 22B, and 22C pick up sheets one by one from the sheet feed cassettes 21A, 21B, and 21C, respectively.

A conveyance system 23 conveys a sheet in the printer 3. The conveyance system 23 includes a plurality of conveyance rollers 23a to 23d and a registration roller 24. The conveyance system 23 conveys the sheet taken out by the sheet feed rollers 22A, 22B, and 22C to the registration roller 24. The registration roller 24 conveys the sheet to a transfer position in accordance with a timing at which an image is transferred.

A plurality of the image forming sections 25 (25Y, 25M, 25C, 25K) forms images of respective colors (yellow, magenta, cyan, black). An exposure device 26 forms an electrostatic latent image as an image to be developed in each color on each image carrier in each of the image forming sections 25 (25Y, 25M, 25C, and 25K). The exposure device 26 forms the electrostatic latent image on the image carrier by exposing the image carrier with the light emitted in response to the image data. For example, the exposure device 26 exposes a photoconductive drum as the image carrier in the main scanning direction by irradiating the photoconductive drum via a rotating polygon mirror with the light emitted by a light emitting section. The irradiation position of the light from the exposure device 26 moves in the sub-scanning direction as the photoconductive drum rotates. Specifically, a position and magnification of an image formed by the image forming section 25 are adjusted by controlling the exposure device 26.

The image forming sections 25 (25Y, 25M, 25C, and 25K) develop electrostatic latent images on the respective image carriers with toners of respective colors (yellow, magenta, cyan, and black). The intermediate transfer belt 27 is an intermediate transfer member. The image forming sections 25 transfer toner images for respective colors developed with the toners of respective colors on respective image carriers onto the intermediate transfer belt 27 (primary transfer).

The intermediate transfer belt 27 conveys the transferred toner image to a secondary transfer position while holding the toner image. The secondary transfer position is a position where the toner image on the intermediate transfer belt 27 is transferred onto a sheet. At the secondary transfer position, a support roller 28a and a secondary transfer roller 28b face each other. The support roller 28a and the secondary transfer roller 28b constitute a transfer section 28. The registration roller 24 conveys the sheet to the secondary transfer position in accordance with a timing at which the toner image on the intermediate transfer belt 27 is transferred. The transfer section 28 transfers the toner image held on the intermediate transfer belt 27 onto the sheet at the secondary transfer position.

For example, in the case of forming a color image, the image forming sections 25Y, 25M, 25C, and 25K transfer toner images developed with toners of respective colors (yellow, magenta, cyan and black) onto the intermediate transfer belt by overlapping the toner images on the intermediate transfer belt 27. The intermediate transfer belt 27 holds a color image obtained by overlapping the toner images for respective colors. The transfer section 28 transfers the color image formed with the toners of plural colors on the intermediate transfer belt 27 onto the sheet at the secondary transfer position. The registration roller 24 conveys the sheet to the secondary transfer position in accordance with a timing at which the toner image on the intermediate transfer belt 27 is transferred. As a result, the color image is transferred onto the sheet.

The transfer section 28 supplies the sheet onto which the toner image is transferred to a fixing device 29. The fixing device 29 fixes the toner image on the sheet. The fixing device 29 has a heating section 29a, a heat roller 29b, and a pressure roller 29c. The heating section 29a heats the heat roller 29b. The heat roller 29b and the pressure roller 29c carry out a fixing processing of heating and pressurizing the sheet onto which the toner image is transferred by the transfer section 28. The heat roller 29b and the pressure roller 29c of the fixing device 29 transmit the sheet on which the fixing processing is performed to the conveyance roller 23d. The conveyance roller 23d conveys the sheet from the fixing device 29 to a sheet discharge section 30.

The operation panel 4 is a user interface. The operation panel 4 displays guidance and receives an input of an operation button or an icon. For example, a user inputs setting information with the operation panel 4. The operation panel 4 has a display section (display) 41, a touch panel 42, and a plurality of operation buttons 43. For example, the touch panel 42 is provided on a display screen of the display section 41. The touch panel 42 detects a portion touched by the user on the display screen of the display section 41.

In the present embodiment, the user refers to a person who operates the digital MFP 1, and may be an end user, an administrator, a service person, and the like.

Next, a configuration of the control system of the digital MFP configured as described above is described.

Figure 3:
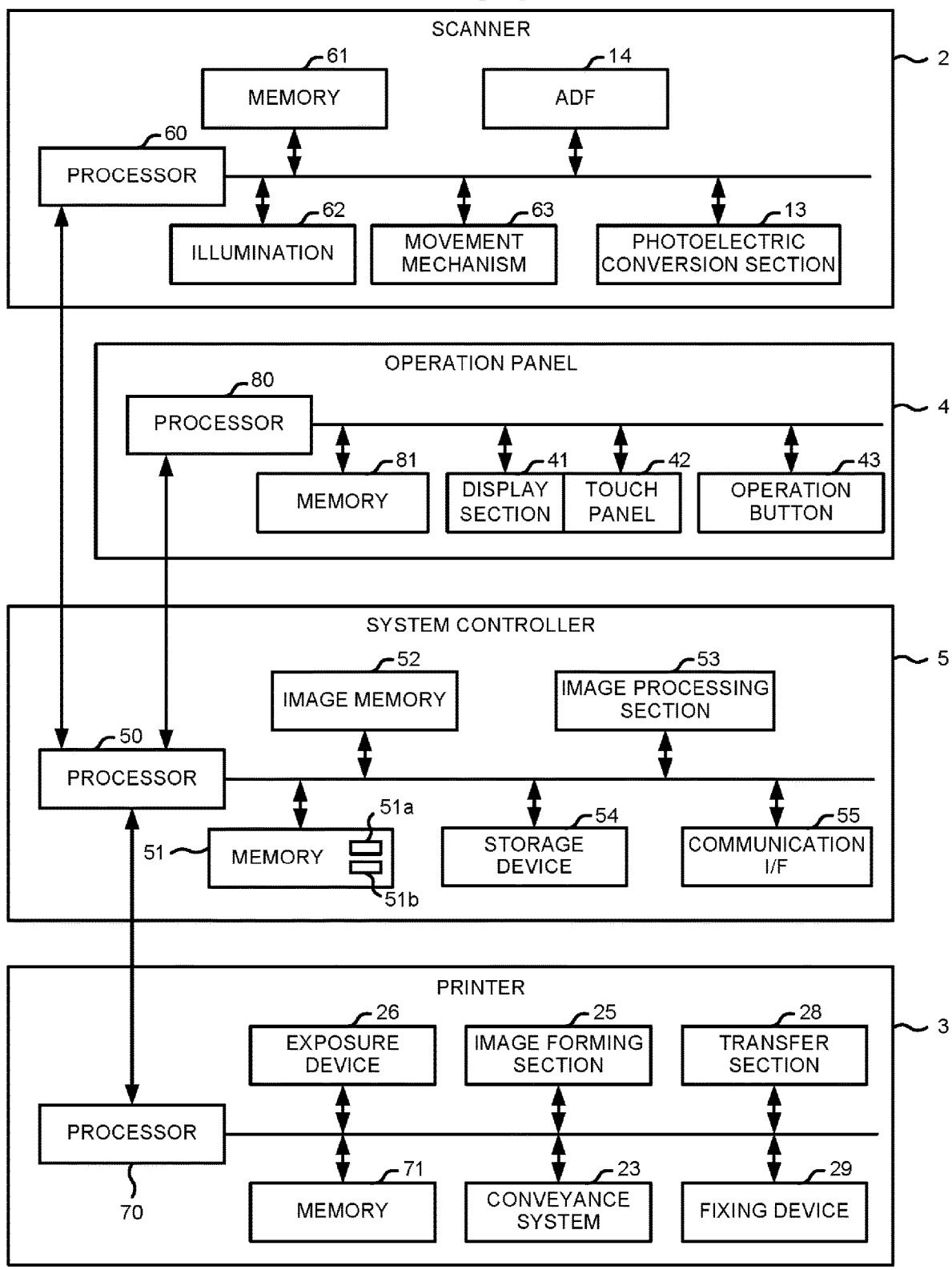
FIG. 3 is a block diagram illustrating an example of a control system in the digital MFP as the image forming apparatus according to the embodiment.

FIG. 3 is a block diagram illustrating an example of the control system of the digital MFP 1.

The digital MFP 1 has a system controller 5 which controls the entire apparatus. The system controller 5 is connected to the scanner 2, the printer 3, and the operation panel 4. As shown in FIG. 3, the system controller 5 includes a processor 50, a memory 51, an image memory 52, an image processing section 53, a storage device 54, and a communication interface (I/F) 55.

The processor 50 is connected to a processor 60 of the scanner 2, a processor 70 of the printer 3, and a processor 80 of the operation panel 4 via interfaces. The processor performs various processing functions by executing programs stored in the memory 51 or the storage device 54. For example, by executing a program stored in the memory 51, the processor 50 outputs an operation instruction to each section and processes various kinds of information from each section.

The memory 51 includes memories such as a RAM (Random Access Memory), a ROM (Read Only Memory), an NVM (Non-Volatile Memory) or the like. The RAM functions as a working memory or a buffer memory. The ROM is a non-rewritable nonvolatile memory. The ROM functions as a program memory. The NVM is a rewritable nonvolatile memory. The NVM stores setting data and the like.

In the present embodiment, the memory 51 has a storage area 51a and a storage area 51b. The storage area 51a and the storage area 51b are rewritable nonvolatile memory areas. The storage area 51a stores information indicating a size of a sheet used for image adjustment in which a below-described setting value to be stored is obtained. The storage area 51b stores sheet information used for correcting the setting value for the image adjustment. The information stored in the storage area 51a and the storage area 51b is described below in detail.

The image memory 52 stores the image data. For example, the image memory 52 functions as a page memory for copying or decompressing the image data to be processed. The image processing section 53 processes the image data. The image processing section 53 performs image processing such as correction, compression, or decompression on the input image data to output the processed image data.

The storage device 54 stores control data, control programs, and data such as the setting information. The storage device 54 is a rewritable nonvolatile memory. For example, the storage device 54 may be an HDD (Hard Disk Drive) or an SSD (Solid State Drive).

The communication I/F 55 is used for establishing data communication with an external device. For example, the communication I/F 55 functions as an image acquisition section that acquires an image to be printed on the sheet from an external device such as a PC (Personal Computer). The communication I/F 55 also functions as an interface for communicating with a server described below.

Next, an example of a configuration of a control system in the scanner 2 is described.

As shown in FIG. 3, the scanner 2 has a processor 60, a memory 61, the ADF 14, the illumination 62, the movement mechanism 63, and the photoelectric conversion section 13.

The processor 60 performs various kinds of processing by executing programs stored in the memory 61. For example, by executing a program, the processor 60 controls the operation of each section in the scanner 2, and monitors an operation state of each section. The processor 60 is connected to the processor 50 of the system controller 5 via the interface. The processor 60 executes scanning processing in response to an operation instruction from the system controller 5.

The memory 61 includes a RAM, a ROM, a data memory, and the like. The RAM functions as a working memory or a buffer memory. The ROM is a non-rewritable nonvolatile memory. The ROM functions as a program memory. The data memory is a rewritable nonvolatile memory.

The ADF 14 has a pickup roller and a conveyance system as a configuration of a control system. The processor 60 drives the pickup roller and the conveyance system to convey the documents one by one to the reading position.

The illumination 62 is provided in the carriage 12 to irradiate the reading position on the document table glass 11 with light. The illumination 62 has a light source that emits light in response to a lighting instruction from the processor 60. The light source is not limited to having a specific configuration. The light emitted by the illumination 62 is reflected by the document placed on the document table glass 11 and then enters the photoelectric conversion section via the optical system such as a mirror, a lens and the like.

The movement mechanism 63 moves the carriage 12. The movement mechanism 63 has a stepping motor as a driving source, and moves the carriage 12 according to driving of the stepping motor. The movement mechanism 63 moves the carriage 12 in response to operation instructions from the processor 60 or the processor 50 of the system controller 5. For example, at the time of scanning the document on the document table glass 11, the processor 60 moves the carriage from a reading start position in the sub-scanning direction (FWD direction).

The photoelectric conversion section 13 includes a photoelectric conversion sensor including photoelectric conversion elements for converting incident light into an electric signal. The photoelectric conversion section 13 includes, for example, a photoelectric conversion sensor, which is a line sensor for generating pixel data corresponding to one line read in the main scanning direction. The photoelectric conversion section 13 also has a lens for inputting the light guided by the optical system provided in the carriage 12 to the photoelectric conversion sensor. Specifically, the photoelectric conversion sensor of the photoelectric conversion section 13 sequentially outputs the pixel data corresponding to each line read in the main scanning direction as the carriage 12 moves in the sub-scanning direction.

Next, an example of a configuration of a control system of the printer 3 is described.

As shown in FIG. 3, the printer 3 has a processor 70, a memory 71, the conveyance system 23, the image forming section 25, the exposure device 26, the transfer section 28, and the fixing device 29.

The processor 70 performs various kinds of processing by executing programs stored in the memory 71. For example, by executing a program, the processor 70 controls the operation of each section of the printer 3 and monitors an operation state of each section. The processor 70 is connected to the processor 50 of the system controller 5 via the interface. The processor 70 executes a printing processing in response to an operation instruction from the system controller 5.

The memory 71 includes memories such as a RAM, a ROM, a data memory, and the like. The RAM functions as a working memory or a buffer memory. The ROM is a non-rewritable nonvolatile memory. The ROM functions as a program memory. The data memory is a rewritable nonvolatile memory.

The conveyance system 23 conveys the sheet in the printer 3 under the control of the processor 70. Specifically, the conveyance system 23 drives conveyance rollers of the respective sections in response to an operation instruction from the processor 70 to convey the sheet.

In response to the operation instruction from the processor 70, the exposure device 26 emits light (laser light) for forming an electrostatic latent image on the photoconductive drum of each image forming section 25. The processor 70 adjusts a printing position and a magnification by controlling the irradiation position of the laser light on the photoconductive drum by the exposure device 26. The processor 70 executes image adjustment such that a printing area becomes a desired printing area by performing operation control according to a printing area starting from a printing reference described below.

The image forming section 25 develops the electrostatic latent images formed on the photoconductive drums with toners of respective colors in response to operation instructions from the processor 70. The image forming section 25 transfers the toner image formed on the photoconductive drum onto the intermediate transfer belt (primary transfer).

The transfer section 28 transfers the toner image transferred onto the intermediate transfer belt 27 onto the sheet (secondary transfer) in response to an operation instruction from the processor 70. The fixing device 29 drives the heat roller 29*b* and the pressure roller 29*c* in response to an operation instruction from the processor 70. The heating section 29*a* of the fixing device 29 heats the surface temperature of the heat roller 29*b* to a desired fixing temperature under the control of the processor 70. In a state in which the fixing device 29 is controlled at the fixing temperature, the fixing device 29 fixes the toner image transferred onto the sheet.

Next, an example of a configuration of a control system of the operation panel 4 is described.

As shown in FIG. 3, the operation panel 4 includes a processor 80, a memory 81, the display section (display) 41, the touch panel 42, and the operation buttons 43.

The processor 80 performs various kinds of processing by executing programs stored in the memory 81. For example, the processor 80 executes a program to control the operation of each section of the operation panel 4 and to monitor an operation state of each section. The processor 80 is connected to the processor 50 of the system controller 5 via the interface. For example, the processor 80 provides the system controller 5 with the information input by the user.

The memory 81 includes memories such as a RAM, a ROM, a data memory and the like. The RAM functions as a working memory or a buffer memory. The ROM is a non-rewritable nonvolatile memory. The ROM functions as a program memory. The data memory is a rewritable nonvolatile memory.

Display contents of the display section 41 are controlled in response to an operation instruction from the processor 80. The touch panel 42 is provided on the display screen of the display section 41 to detect a touched position on the display screen. For example, the processor 80 displays an operation guidance and icons capable of being selected with the touch panel 42 on the display screen of the display section 41. The processor 80 determines information input by the user according to the touched position detected by the touch panel 42. The operation button 43 includes hard keys such as a start key, a reset key, and the like.

Next, a flow until the digital MFP 1 becomes usable by a user after the image adjustment is performed at a manufactory is briefly described.

Figure 4:
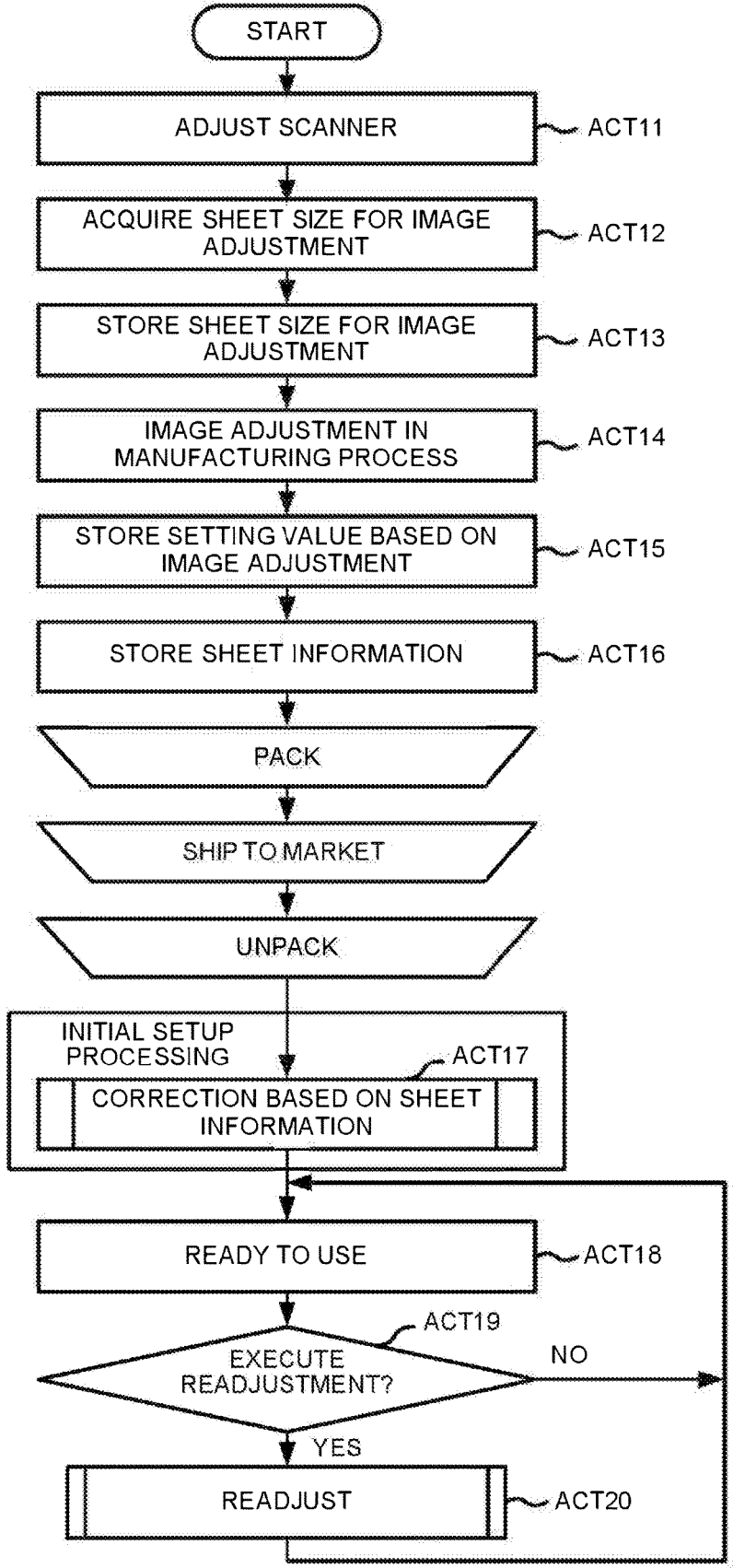
FIG. 4 is a flowchart depicting a flow until the digital MFP as the image forming apparatus becomes usable according to the embodiment.

FIG. 4 is a flowchart depicting a flow until the digital MFP 1 becomes usable.

The digital MFP 1 is manufactured at a manufactory as the image forming apparatus having the hardware configuration shown in FIG. 1 to FIG. 3. Various kinds of settings and adjustment are performed on the digital MFP 1 during a working process (manufacturing process) in the manufactory. Hereinafter, in the present embodiment, processing and work relating to the image adjustment for the digital MFP 1 are mainly described.

In a manufacturing process, the digital MFP 1 adjusts the scanner 2 (ACT 11). The scanner 2 is adjusted so that image data read through the document table glass 11 is in a reference (standard) state. The adjustment of the scanner 2 is performed by scanning a reference chart that is created with high precision and is set on the document table glass 11. The reference chart may be any chart as long as it has a pattern indicating a reference position in the sub-scanning direction and the main scanning direction and capable of being read by the scanner 2. For example, the reference chart may have a pattern indicating a reference position with an error occurring in a medium made of a member that does not change in the magnitude depending on humidity and temperature (temperature range in the living environment) being less than a predetermined value.

The processor 60 of the scanner 2 is started using an initial setting value to read the reference chart set on the document table glass 11. The processor 60 analyzes a shift amount in the sub-scanning direction and the main scanning direction based on the read image of the reference chart at the initial setting value. For example, the processor 60 detects the shift amount in the sub-scanning direction from the read image of the reference chart. The processor 60 adjusts a setting value for driving and controlling the movement mechanism 63 based on the detected shift amount in the sub-scanning direction. As a result, the processor 60 adjusts a movement speed of the movement mechanism 63 in the sub-scanning direction so that the reference chart is read using a reference number of dots in the sub-scanning direction. The processor 60 of the scanner 2 adjusts a setting value for output data of the read image based on the shift amount in the main scanning direction. The processor 60 adjusts the output data so as to read the reference chart using a specified number of dots in the main scanning direction.

After the scanner 2 is adjusted, the processor 50 of the system controller 5 determines a size of the sheet (first sheet) used for image adjustment in the manufactory (manufacturing process) (ACT 12). For example, the processor 50 may determine the size of the first sheet by scanning the sheet (blank sheet) used for image adjustment with the scanner 2. The processor 50 may determine a size based on an input by the operator through the operation panel 4 as the size of the first sheet. If the size of the first sheet is determined, the processor 50 stores the determined size of the first sheet in the storage area 51*a* of the memory 51 (ACT 13).

If the size of the first sheet (sheet used for image adjustment in the manufacturing process) is stored, the processor 50 of the system controller 5 executes the image adjustment using the scanner 2 with the first sheet (ACT 14). Generally, there are several kinds of image adjustment methods in the image forming apparatus. In the digital MFP 1 according to the present embodiment, the image adjustment is performed in such a manner that a center of the sheet coincides with a center of the image to be printed on the sheet. Specifically, the digital MFP 1 performs the image adjustment so that print margins over the entire circumference of the sheet become uniform so as to print an image at the center of the sheet.

Here, the image adjustment executed by the digital MFP 1 according to the present embodiment is described in detail.

In the image adjustment of the digital MFP 1, the printer 3 prints a pattern for the image adjustment (adjustment pattern) on the sheet. The scanner 2 reads the sheet on which the adjustment pattern is printed. The system controller 5 performs the image adjustment based on the read image of the sheet on which the adjustment pattern is printed by the scanner 2. The processor 50 of the system controller 5 specifies a setting value (setting value for the image adjustment) for printing an image on the sheet based on a read image of the adjustment pattern by the scanner 2. The processor 50 stores the setting value (setting value for the image adjustment) specified based on the read image by the scanner 2 in the memory 51. In the present embodiment, during the image adjustment in the manufacturing process, the setting value for adjusting a printing area of the image on the first sheet is specified as the setting value for the image adjustment.

Figure 5:
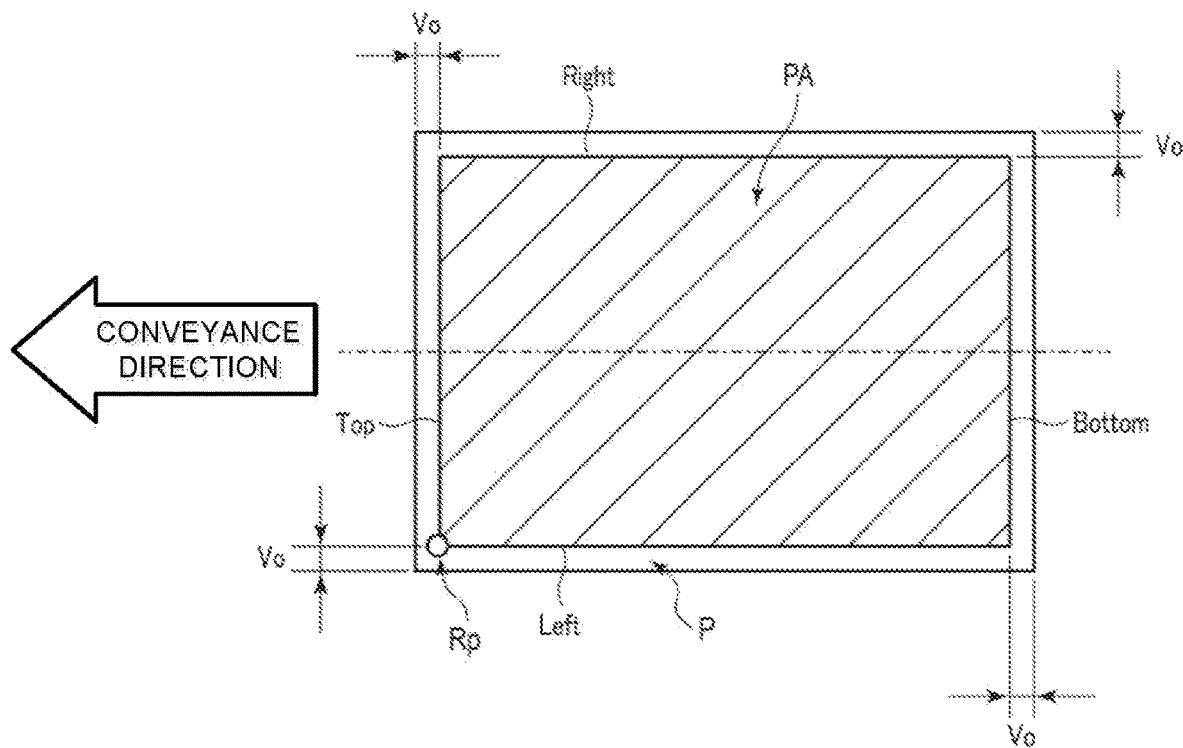
FIG. 5 is a diagram illustrating a printing area on the sheet set by the digital MFP as the image forming apparatus according to the embodiment.

FIG. 5 is a diagram illustrating a printing area PA of a sheet set by the digital MFP 1.

In the image adjustment, the digital MFP 1 sets the printing area PA starting from a printing reference Rp according to a conveyance timing of the sheet, the size of the sheet, and the like. The printing area PA of the sheet P is set in such a manner that a range at a certain distance Vo from an end of the sheet P is a margin. The printing reference Rp is set using a front end Top and a left end Left of the printing area PA in a conveyance direction of the sheet P. The system controller 5 sets a position at the distance Vo from the front end of the sheet P as the front end Top of the printing area PA, and sets a position at the distance Vo from the left end of the sheet P as the left end Left of the printing area PA in the conveyance direction of the sheet P. The exposure device 26 controls the exposure of the photoconductive drum of the image forming section 25 according to the conveyance timing of the sheet P so that a position at which writing of a print image is started is the printing reference Rp.

The printing area PA is further set using a right end Right and a rear end Bottom in the conveyance direction in addition to the front end Top and the left end Left indicating the printing reference Rp. The right end Right of the printing area PA is adjusted using a magnification (magnification in a direction perpendicular to the conveyance direction) in the main scanning direction from the printing reference Rp. The rear end Bottom of the printing area PA is adjusted using a magnification in the sub-scanning direction from the printing reference Rp (magnification in the sheet conveyance direction).

Figure 6:
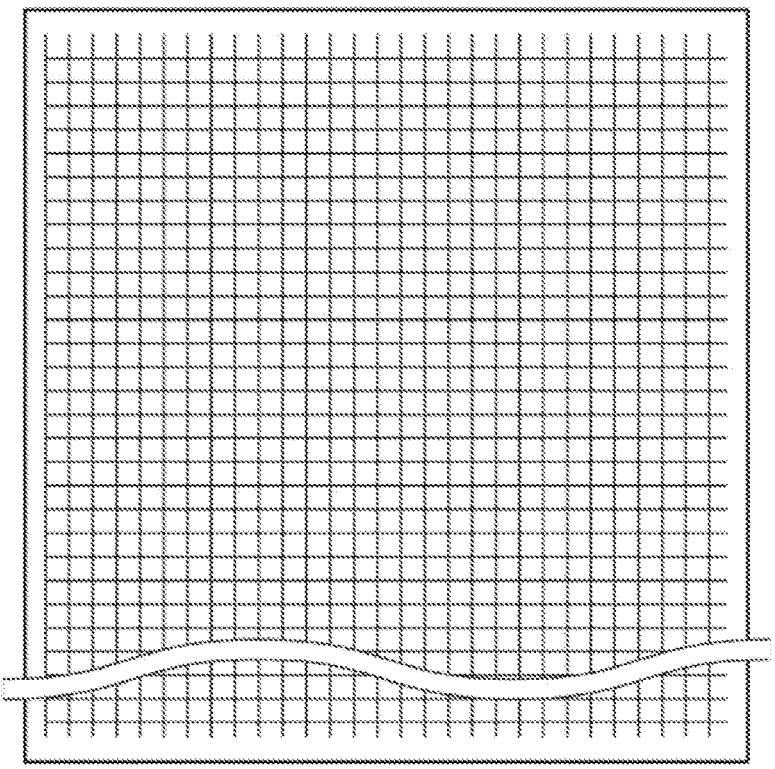
FIG. 6 is a diagram illustrating an example of a first adjustment pattern used for an image adjustment carried out by the digital MFP as the image forming apparatus according to the embodiment.
Figure 7:
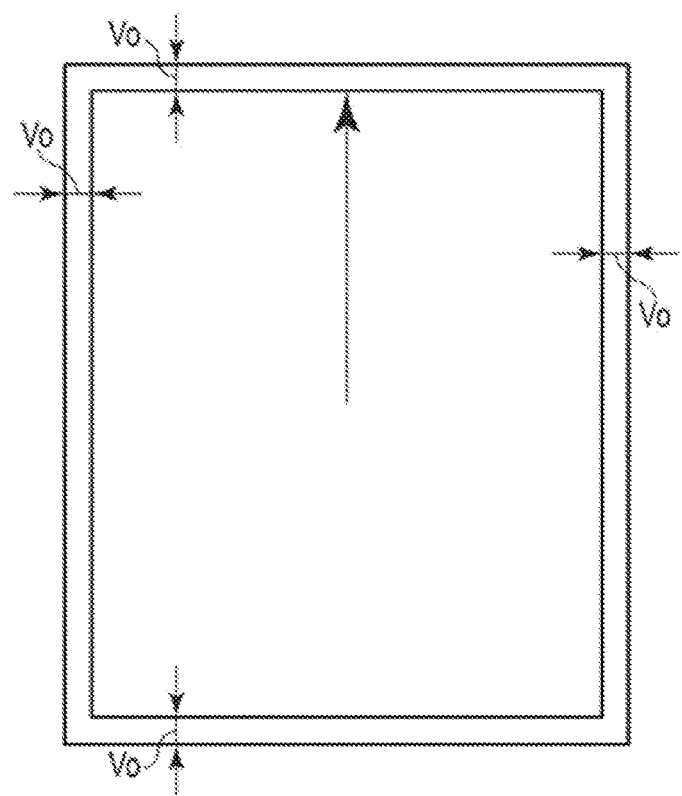
FIG. 7 is a diagram illustrating an example of a second adjustment pattern used for the image adjustment carried out by the digital MFP as the image forming apparatus according to the embodiment.

FIG. 6 shows an example of a first adjustment pattern used for the image adjustment. FIG. 7 shows an example of a second adjustment pattern used for the image adjustment.

In the image adjustment of the present embodiment, the printer 3 prints the adjustment pattern on the sheet (first sheet). The scanner 2 reads an image on the sheet on which the printer 3 printed the adjustment pattern. The system controller 5 specifies an actual printing area on the sheet from the read image by the scanner 2 to determine the setting value for the image adjustment based on the specified printing area.

The system controller 5 determines a distance (an amount of a margin) from the end of the sheet to the printing area over the entire circumference of the sheet based on the specified pattern detected from the read image of the adjustment pattern. In the example shown in FIG. 5, the printing area PA on the sheet P is specified using positions of the front end Top, the left end Left, the right end Right, and the rear end Bottom. Therefore, in the read image of the adjustment pattern, the processor 50 determines a distance from the front end of the sheet P to the front end Top of the printing area PA, a distance from the left end of the sheet P to the left end Left of the printing area PA, a distance from the right end of the sheet P to the right end Right of the printing area PA, and a distance from the rear end of sheet P to the rear end Bottom of the printing area PA, respectively.

For example, a first adjustment pattern shown in FIG. 6 is a grid-like pattern formed by arranging straight lines (lines) in the main scanning direction and the sub-scanning direction (conveyance direction) at a predetermined interval. In the first adjustment pattern, the arrangement interval between the lines is known. In the sheet on which the first adjustment pattern is printed, a distance from the end of the sheet to the printing area can be specified by measuring a distance from the end of the sheet to a line of a predetermined number. The processor 50 determines the distance from the end of the sheet to a line of a predetermined number in the read image by the scanner 2.

For example, the processor 50 determines a distance from the end of the sheet to a line closest to the end of the sheet in the read image of the first adjustment pattern. In this manner, the processor 50 determines the distance from the end of the sheet to the printing area. There is a digital MFP that has a function of detecting a specific line to detect inclination or the like of the printed image. In such a digital MFP, the efficiency of the processing can be improved if the distance from the end of the sheet to the above specific line is determined.

A second adjustment pattern shown in FIG. 7 is a pattern having a rectangular line indicating a printing area and a mark (arrow) indicating the conveyance direction. In the sheet on which the second adjustment pattern is printed, the distance from the end of the sheet to the printing area can be easily determined by measuring a distance from the end of the sheet to the line indicating the printing area.

The digital MFP of the present embodiment performs an adjustment in such a manner that the printing area (position where the image is printed) is positioned at the center of the sheet as the image adjustment. Specifically, the digital MFP 1 performs setting in the image adjustment in such a manner that the center of the sheet and the center of the image (printing area) on the sheet coincide with each other. If the distance (margin) from the end of the sheet to the printing area in each side of the sheet is equal, the center of the sheet and the center of the printing area coincide with each other.

The processor 50 performs the image adjustment in such a manner that the distance (margin) from the end of the sheet to the printing area is equal to a certain distance, and in this way, the center of the sheet coincides with the center of the printing area. For example, in the case of setting the printing area PA as shown in FIG. 5, the processor 50 sets the positions of the front end Top, the left end Left, the right end Right, and the rear end Bottom so that the distances from the corresponding ends of the sheet to the positions thereof are equal to a certain distance Vo.

On the other hand, in a printing processing of the printer 3, the digital MFP 1 applies heat to the sheet in a fixing processing by the fixing device 29. The size of the sheet on which the fixing device 29 performs the fixing processing shrinks due to evaporation of moisture caused by the heat from the fixing device 29. The sheet shrinking in size due to the fixing processing gradually returns to the size before the fixing processing as the time elapses. An amount by which the sheet shrinks due to the fixing processing varies depending on a material of the sheet or the like, and the time taken for the shrinking sheet to return to the original size thereof cannot be not uniquely determined.

Figure 8:
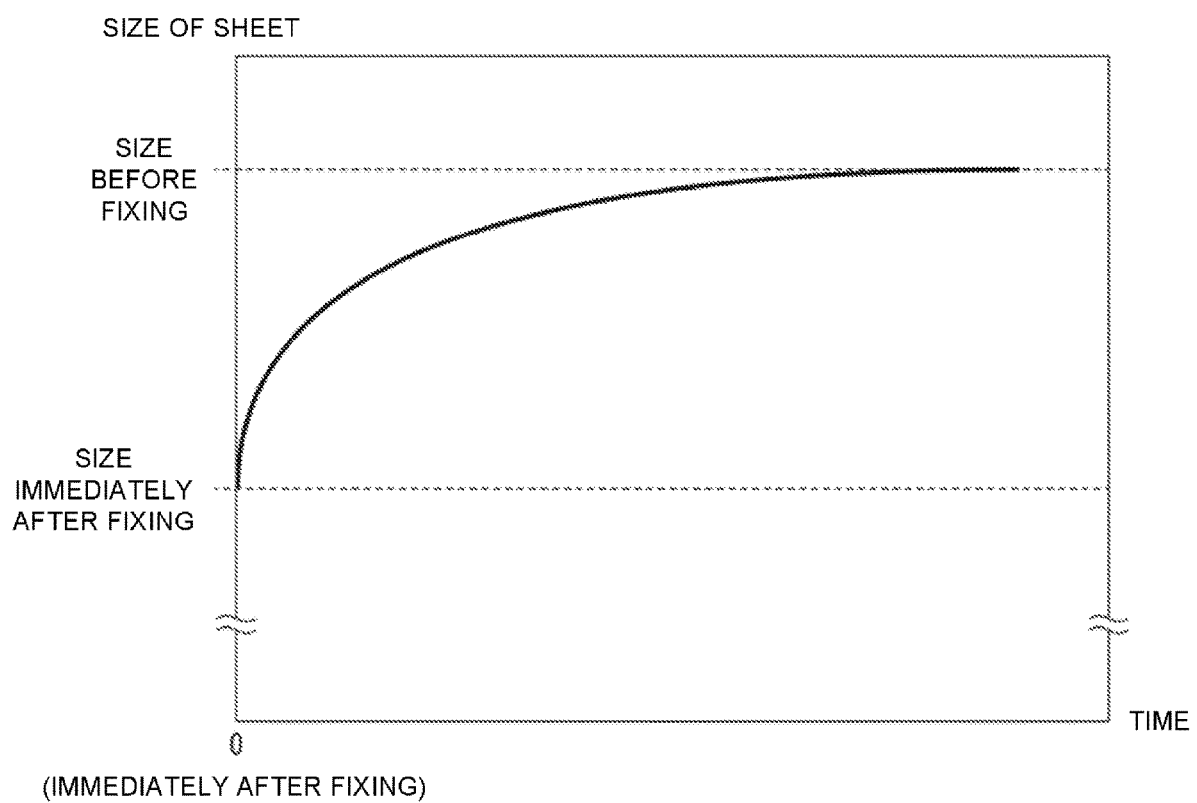
FIG. 8 is a diagram illustrating shrinkage of a sheet due to fixing processing by the digital MFP as the image forming apparatus according to the embodiment.

FIG. 8 is a diagram illustrating an example of a change in the size of the sheet due to the fixing processing.

As shown in FIG. 8, since the sheet shrinks in the size thereof due to the fixing processing, the amount by which the sheet shrinks is at maximum immediately after the fixing processing. After the fixing processing, the size of the sheet shrinking due to the fixing processing (printing processing) changes in such a manner that the size of the sheet gradually returns to a size before the fixing processing as the time elapses. Therefore, in the image adjustment, the size of the sheet changes according to the elapse of the time from a moment when the adjustment pattern is printed on the sheet to a moment when the scanner 2 reads the image. In other words, it is considered that the size of the sheet changes according to timing of a work accompanying the image adjustment.

According to the image adjustment in the digital MFP 1, the influence of the shrinkage of the sheet can be reduced by performing the adjustment in such a manner that the center of the sheet coincides with the center of the printing area. In other words, when the center of the sheet coincides with the center of the printing area, even if the sheet shrinks, the change in the printing area can be smaller than the change in the size of the sheet.

Here, a specific example is described with reference to FIG. 7.

For example, it is assumed that the size of an A3 sheet is 420 mm in a conveyance direction (sub-scanning direction) and 297 mm in a direction (main scanning direction) orthogonal to the conveyance direction. The margin (VO shown in FIG. 7) for defining the printing area on the sheet is 5 mm. In this case, for the above A3 sheet (the size of which is 297 mm*420 mm), the printing area is 287 mm*410 mm. When the sheet of which size is 297 mm*420 mm uniformly shrinks by 0.5% in the fixing processing, between the above A3 sheet before the fixing processing and the above A3 sheet after the fixing processing, a difference (shift) of 1.435 mm in the sub-scanning direction and 2.05 mm in the main scanning direction is generated.

Specifically, if the printing area is set with the end of the sheet immediately after the fixing processing as a reference, the shift of 1.435 mm in the sub-scanning direction and 2.05 mm in the main scanning direction occurs in the above A3 sheet due to shrinkage by 0.5%. On the other hand, if the printing area is adjusted in such a manner that the distance from the end of the sheet becomes uniform (if the center of the sheet coincides with the center of the printing area), even if the above A3 sheet shrinks by 0.5% due to the fixing processing, the shift in both the sub-scanning direction and the main scanning direction is 0.025 mm. In other words, if the printing area is adjusted in such a manner that the distance from the end of the sheet becomes uniform, the shift of the image due to shrinkage of the sheet caused by the fixing processing can be reduced. According to the digital MFP 1 of the present embodiment, by performing the image adjustment in such a manner that the distance from the end of the sheet is made uniform, it is possible to reduce the influence of shrinkage due to the fixing processing or the like and to improve the adjustment accuracy of a printing position for the sheet.

If the image adjustment using the scanner 2 is completed, the processor 50 of the system controller 5 stores sheet information relating to the sheet (second sheet) to be used by users in the storage area 51b of the memory 51 (ACT 16). In the present embodiment, the storage area 51b stores the sheet information to be referred to in an initial setup processing. The sheet information stored in the storage area 51b includes information indicating a size of the sheet (second sheet) to be used by users.

The sheet information stored in the storage area 51b may indicate a difference (shift amount) between the second sheet and the first sheet used for the image adjustment during the manufacturing process. The sheet information may be stored in association with a self-diagnosis code. The sheet information may be individually set according to an area of a shipping destination every time the digital MFP 1 is shipped. A plurality of kinds of sheet information for a plurality of areas may be stored in the storage area 51b so that the sheet information corresponding to a designated area in the market can be referred to.

The sheet information relating to the second sheet may be stored in the storage area 51b of the memory 51 at any timing as long as the sheet information is stored before the digital MFP 1 carries out a correction using the sheet information in the market after shipment. Therefore, the processing in ACT 16 may be executed at any timing as long as it is executed before ACT 17.

If the image adjustment and the setting of the sheet information in the market are completed, the digital MFP 1 is packed for shipment. The packed digital MFP 1 is transported to each shipping destination (customer) in the market. Upon arrival at the shipping destination, the digital MFP 1 is unpacked at the shipping destination. The unpacked digital MFP 1 is installed at a location desired by the user and is then connected to a power supply.

The system controller 5 of the digital MFP 1 installed at the shipping destination first executes the initial setup processing. For example, the processor 50 of the system controller 5 executes a series of processing including adjustment of a developer, adjustment of image density, an error check of each section and the like as the initial setup processing. In the present embodiment, during the initial setup processing, the processor 50 executes a correction processing using the sheet information stored in the second storage area 51b as the image adjustment in the market (ACT 17). The image adjustment (correction processing) in the market is described in detail below.

The image adjustment in the market is processing of correcting (adjusting) the setting value set during the image adjustment in the manufacturing process according to the sheet used in the market. By performing the image adjustment in the market at the initial setup processing, the digital MFP can change an adjustment result at the manufacturing floor to a setting suitable for the usage environment immediately before the user uses the digital MFP 1. For example, it is possible to easily make fine adjustment to deal with a change in the sheet size when the temperature and humidity environment of the manufacturing floor is significantly different from the usage environment of the user.

If the initial setup processing including the image adjustment in the market is completed, the processor 50 sets a state of the digital MFP 1 to a usable state (ACT 18). As a result, the digital MFP 1 can perform printing based on the setting value corrected based on the sheet information stored in the storage area 51*b* on a sheet used in the market.

The image adjustment in the market (correction processing using the sheet information) may be performed immediately before the digital MFP 1 is shipped. In this case, information relating to the sheet used at the shipping destination is stored as the sheet information in the second storage area 51*b*, and the image adjustment in the market (correction processing using the sheet information) is executed before shipment.

After the initial setup processing is completed and the digital MFP 1 becomes usable, the digital MFP 1 has a function of readjusting the setting value for the image adjustment in response to an instruction from the user or the like. Specifically, the processor 50 receives a request for readjustment by operating the operation panel 4. For example, the user instructs the readjustment on the setting value for the image adjustment as one of adjustment modes using the operation panel 4.

If the readjustment on the setting value for the image adjustment is instructed through the operation panel 4 (Yes in ACT 19), the processor 50 executes a readjustment processing to correct (adjust) the current setting value (ACT 20). During the readjustment processing, a size of a sheet for the readjustment that an operator such as a user in the market designates is acquired, and the setting value is corrected based on the acquired size of the sheet. The readjustment processing in response to an operation performed by the operator in the market is explained in detail below.

Next, the correction processing using the sheet information as the image adjustment in the market in the digital MFP 1 is described.

Figure 9:
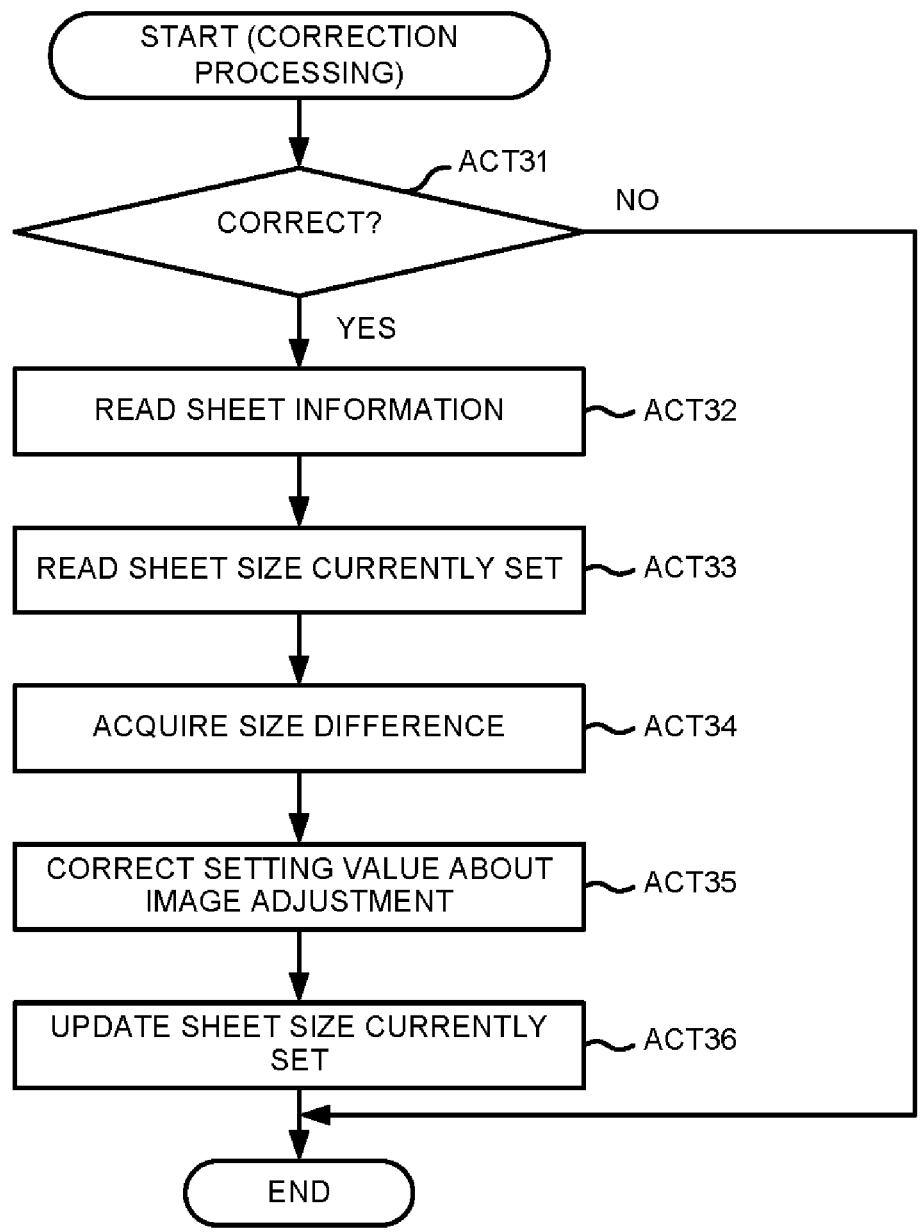
FIG. 9 is a flowchart depicting setting value correction processing as part of the image adjustment in the digital MFP as the image forming apparatus according to the embodiment.

FIG. 9 is a flowchart depicting the correction processing using the sheet information as the image adjustment in the market in the digital MFP 1.

As described above, in the initial setup processing, the digital MFP 1 performs the correction processing for correcting the setting value for the image adjustment according to the sheet information relating to the sheet (second sheet) used in the market. Specifically, the digital MFP 1 stores the sheet information for the image adjustment (correction processing) in the market in the second storage area 51*b* when it is necessary to adjust the setting value based on the image adjustment in the manufacturing process in the market.

The sheet information stored in the second storage area 51*b* relates to a sheet (second sheet) used in the market. For example, the sheet information stored in the second storage area 51*b* includes information indicating the size of the sheet (second sheet) used in the market. The sheet information stored in the second storage area 51*b* may indicate the difference (shift amount) between the second sheet and the sheet (first sheet) used for the image adjustment in the manufacturing process.

In the initial setup processing, the processor 50 of the system controller 5 determines whether to execute the correction processing based on the sheet information stored in the second storage area 51*b* (ACT 31). For example, if the size of the first sheet stored in the first storage area 51*a* is the same as that of the sheet indicated by the sheet information stored in the second storage area 51*b*, the processor 50 determines that the current correction (adjustment) on the setting value for the image adjustment is unnecessary (No in ACT 31).

If it is determined to execute the correction processing (Yes in ACT 31), the processor 50 reads the sheet information for correcting the setting value for the image adjustment from the second storage area 51*b* (ACT 32). If the sheet information is read from the second storage area 51*b*, the processor 50 reads the sheet size (sheet size of the first sheet) corresponding to the current setting value for the image adjustment from the first storage area 51*a* (ACT 33).

The processor 50 acquires the difference (shift amount) between the currently set sheet size and the sheet size obtained from the sheet information used for correction processing (ACT 34). For example, the processor 50 acquires the difference (shift amount) by calculating a difference between the currently set sheet size and the sheet size obtained from the sheet information used for the correction processing. However, the sheet information may be information indicating the difference (shift amount) between the size of the currently set sheet (first sheet) and the size of the sheet (second sheet) used for the correction. In this case, the processor 50 acquires a shift amount as the size difference from the sheet information.

If the difference is acquired, the processor 50 corrects the current setting value for the image adjustment according to the size difference (ACT 35). The correction based on the sheet information (image adjustment in the market) may be any processing as long as the current setting value is corrected according to the size difference. In the manufacturing process, accurate image adjustment by specialized workers can be expected. Therefore, if the setting value for the image adjustment in the manufacturing process is corrected according to the size difference of the sheet, it can be expected that the setting value after correction is an accurate setting value corresponding to the sheet size.

Figure 10:
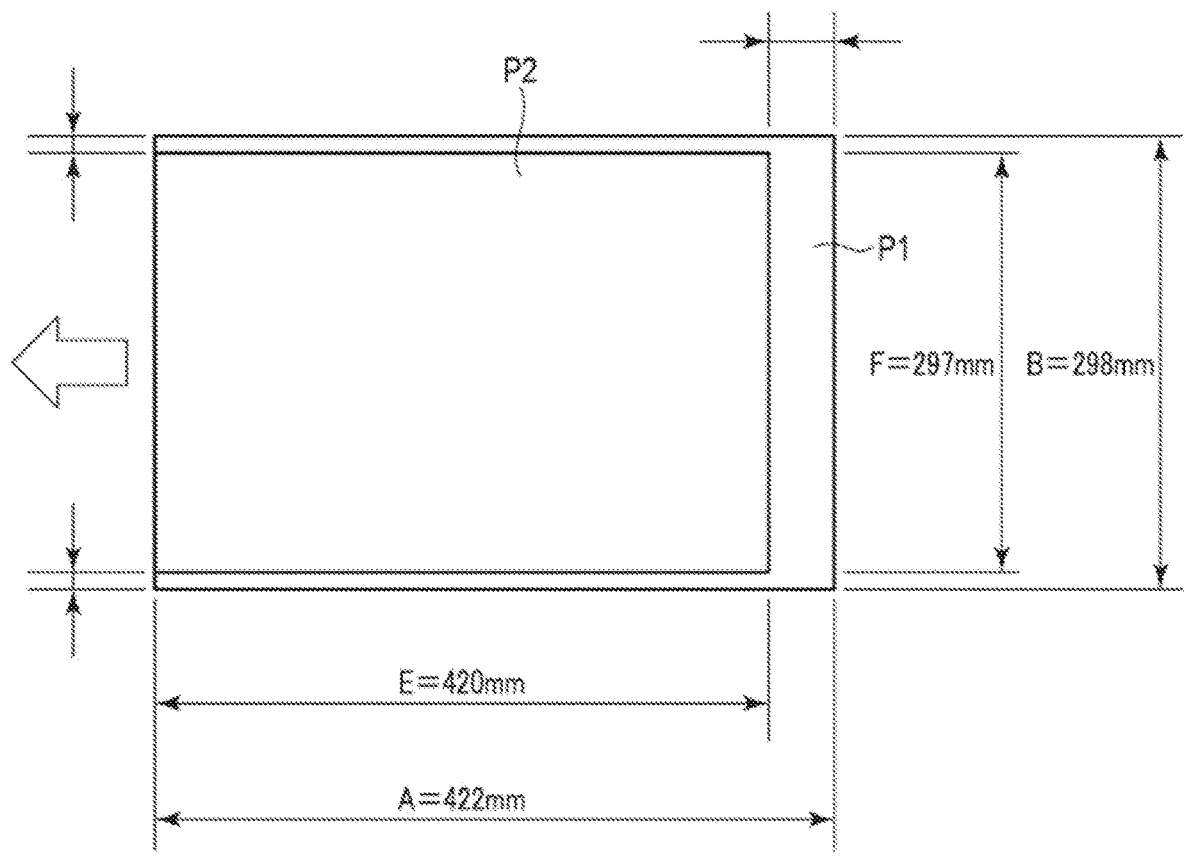
FIG. 10 is a diagram illustrating an example of a first sheet used for image adjustment and a second sheet used for a setting value correction carried out by the digital MFP as the image forming apparatus according to the embodiment.

FIG. 10 is a diagram illustrating a specific example of a sheet (first sheet) P1 used for the image adjustment during the manufacturing process and a sheet (second sheet) P2 used in the market.

In the example shown in FIG. 10, the size of the first sheet P1 is 422 mm in length (A) and 298 mm in width (B) with respect to the sheet conveyance direction. The size of the second sheet P2 is 420 mm in length (E) and 297 mm in width (F) with respect to the sheet conveyance direction.

If the printing area is set using the information of four positions as shown in FIG. 5, the processor 50 corrects the setting value for the image adjustment as follows in the image adjustment (fine adjustment) in the market.

First, the position of the front end Top does not change regardless of the sheet size as long as the sheet is controlled to be conveyed with the front end as a reference. Therefore, even if the sheet size changes, the correction on the position of the front end Top is unnecessary during the image adjustment in the market.

The position of the left end Left is adjusted according to the size difference in a sheet width direction. As a result, the writing position of the image by the exposure device 26 is adjusted. In the example shown in FIG. 10, the size difference in the sheet width direction is 298 mm (B)−297 mm (F)=1.0 mm. In the digital MFP 1, since the adjustment with the center of the sheet as the reference is performed, the position of the left end Left is moved by a distance corresponding to the half of the size difference. Therefore, in the example shown in FIG. 10, the position of the left end Left is corrected in such a manner that the position thereof is shifted only by {298 mm (B)−297 mm (F)}/2=0.5 mm.

The position of the right end Right is adjusted according to the size difference in the sheet width direction. The position of the right end Right is adjusted using the magnification in the main scanning direction of the image that the exposure device 26 forms on the photoconductive drum (image carrier) of the image forming section 25. In the example shown in FIG. 10, since the difference in the sheet width direction is 1.0 mm, the position of the right end Right is also shifted by a distance corresponding to half of the size difference. Therefore, in the example shown in FIG. 10, the position of the right end Right is corrected using the magnification in the main scanning direction in such a manner that the position of the right end Right is reduced only by 0.5 mm.

The position of the rear end Bottom is adjusted according to the size difference in a sheet length direction. The position of the rear end Bottom is adjusted using the magnification in the sub-scanning direction of the image that the exposure device 26 forms on the photoconductive drum (image carrier) of the image forming section 25. In the example shown in FIG. 10, the size difference in the sheet length direction is 422 mm (A)–420 mm (E)=2.0 mm. Since the position of the front end Top does not change as described above, the position of the rear end Bottom is moved by the size difference in the sheet length direction. Therefore, in the example shown in FIG. 10, the position of the rear end Bottom is corrected using the magnification in the sub-scanning direction in such a manner that the position of the rear end Bottom is reduced only by {422 mm (A)–420 mm (E)}=2.0 mm.

After the setting value for the image adjustment is corrected based on the sheet information stored in the second storage area 51*b*, the processor 50 updates the sheet size stored in the first storage area 51*a* to the size of the second sheet (sheet size based on sheet information) (ACT 36). Specifically, if the setting value for the image adjustment is corrected, the processor 50 overwrites the size of the sheet used for the correction processing in the first storage area 51*a*. As a result, the sheet size corresponding to the current setting value is stored in the first storage area 51*a*.

Next, the readjustment processing on the setting value for the image adjustment by the operator in the market in the digital MFP 1 is described.

Figure 11:
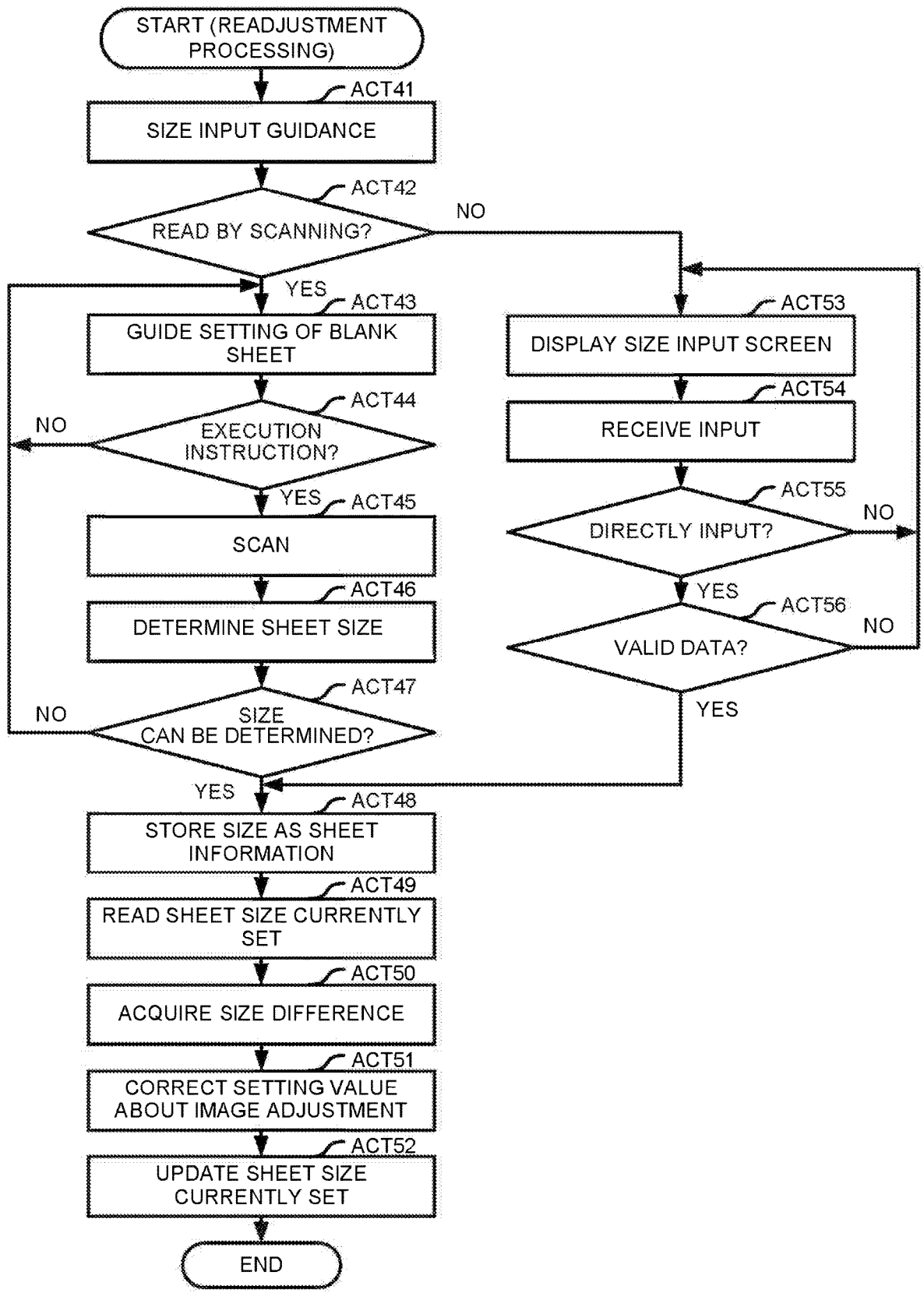
FIG. 11 is a flowchart depicting readjustment processing of the setting value for the image adjustment in the digital MFP as the image forming apparatus according to the embodiment.

FIG. 11 is a flowchart depicting the readjustment processing on the setting value for the image adjustment in the digital MFP 1.

During the initial setup processing, the setting value for the image adjustment is corrected based on the sheet information stored in the second storage area 51*b* before shipment in the digital MFP 1. However, there is a case in which the sheet information stored in the second storage area 51*b* before shipment does not match a sheet actually used in the digital MFP 1. To such an issue, the digital MFP 1 according to the embodiment has a function of readjusting the setting value for the image adjustment in response to the operation performed by the operator (user).

If the operator wants to execute the readjustment, the operator instructs execution of the readjustment processing using the operation panel 4. As described above, the processor 50 of the system controller 5 executes the readjustment processing in response to the readjustment execution instruction input by the operator through the operation panel 4. If the execution of the readjustment processing is instructed, the processor 50 displays an operation guide for inputting a size of a sheet (sheet for readjustment) used for readjustment on the display 41 of the operation panel 4 (ACT 41). Here, it is assumed that the operator can select either a method of obtaining the size of the sheet for readjustment from the read image by the scanner 2 or a method of directly inputting the size using the operation panel 4.

If the method of acquiring the size using the scanner 2 is selected (Yes in ACT 42), the processor 50 displays a guidance for instructing the operator to set the sheet for readjustment and to start scanning on the display 41 (ACT 43). Here, it is assumed that the sheet for readjustment is set on the document table glass 11 in a blank state. The processor 50 displays guidance and receives the instruction to start scanning.

If the start of scanning is instructed (Yes in ACT 44), the processor 50 controls the scanner 2 to scan the sheet on the document table glass 11 (ACT 45). The scanner 2 scans the sheet on the document table glass 11 in response to the instruction from the processor 50. In this case, an image may be read according to a scanning setting that can detect a blank sheet set on the document table glass 11. The scanner 2 supplies the scanned image to the system controller 5.

If the scanned image is acquired from the scanner 2, the processor 50 of the system controller 5 executes processing of detecting the size of the sheet for readjustment from the acquired scanned image (ACT 46). For example, the processor detects the size of the sheet for readjustment by detecting the ends of the blank sheet (sheet for readjustment) set on the document table glass 11 from the scanned image.

If the processing of detecting the sheet size is terminated, the processor 50 determines whether or not the size can be determined from the scanned image (ACT 47). If the size of the sheet cannot be determined from the scanned image (No in ACT 47), the processor 50 notifies an error due to undetectable size. After notifying the error, the process returns to ACT 43, and the processor 50 may instruct setting of a blank sheet. After notifying the error, the process may return to ACT 41, and the processor 50 may receive direct input of the size.

If the size of the sheet can be determined from the scanned image (Yes in ACT 47), the processor 50 stores the information indicating the detected size in the second storage area 51*b* as the sheet information (ACT 48). The processor 50 updates the sheet information stored in the second storage area 51*b* by overwriting the information indicating the size detected from the scanned image in the second storage area 51*b*. If the sheet information stored in the second storage area 51*b* is updated, the processor 50 performs processing of correcting the current setting value for the image adjustment based on the updated sheet information.

If the sheet information stored in the second storage area 51*b* is updated, the processor 50 reads the currently set sheet size stored in the first storage area 51*a* (ACT 49). If the currently set sheet size stored in the first storage area 51*a* is read, the processor 50 acquires a difference (shift amount) between the size of the currently set sheet and the sheet size obtained from the updated sheet information (ACT 50).

If the difference in the sheet size is acquired, the processor 50 corrects the current setting value for the image adjustment according to the difference in the sheet size (ACT 51). The correction based on the sheet information (image adjustment in the market) may be performed by the same processing as in ACT 35 described above. After correcting the setting value for the image adjustment, the processor 50 updates the size of the sheet stored in the first storage area 51*a* to the size of the sheet (size of the sheet for readjustment) stored in the second storage area 51*b* (ACT 52).

If the method of direct inputting the size of the sheet for readjustment is selected (No in ACT 42), the processor 50 displays an input screen for inputting the size on the display 41 (ACT 53). In a state in which the input screen is displayed, the processor 50 receives an input of the size through the touch panel 42 or the operation button 43 (ACT 54).

If the size is directly input (Yes in ACT 55), the processor 50 determines whether the input size is valid (ACT 56). If the input data is not valid as the sheet size (No in ACT 56), the processor 50 notifies an input error of the size. After notifying the error, the process returns to ACT 53, and the processor 50 displays a size input screen and receives input of the size again. After notifying the error, the process may return to ACT 41, and the processor 50 receives the input of the size using the scanner 2.

If it is determined that the input sheet size is valid (Yes in ACT 56), the processor 50 stores the information indicating the input size in the second storage area 51b as the sheet information (ACT 48). Specifically, the processor 50 updates the sheet information stored in the second storage area 51b to information indicating the input size of the sheet. If the sheet information stored in the second storage area is updated, the process proceeds to ACT 49 and the processor 50 performs the processing of correcting the current setting value for the image adjustment based on the updated sheet information.

As described above, in the digital MFP according to the present embodiment, the setting value for adjusting the first sheet used for the image adjustment during the manufacturing process in which the adjustment pattern is printed in such a manner that the printing area is away from the end of the sheet by a certain distance based on the image read by the scanner is stored in the memory. The digital MFP performing the image adjustment corrects the setting value based on the image adjustment based on the sheet information relating to the second sheet when the second sheet having a different size from the first sheet used for the image adjustment during the manufacturing process is used.

In this way, the digital MFP can set the setting value less effected by the shrinkage of the sheet due to the fixing processing or the like in the image adjustment in the manufacturing process, and can optimize the setting value for the image adjustment used during the manufacturing process according to the second sheet used in the market. As a result, the setting value less effected by the shrinkage of the sheet due to the heat applied in the printing processing can be set during the manufacturing process, and the setting value can be easily corrected in response to the change in the sheet occurring due to the difference in the environment in the manufacturing process and the usage environment.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus comprising:
   a scanner;
   a printer configured to print an image based on an image read by the scanner;
   a memory; and
   a processor configured to:
   control the printer to print an adjustment test pattern on a first sheet, and the scanner to scan the adjustment test pattern on the first sheet,
   determine a setting value for adjusting positioning of an image to be printed by the printer on a sheet of the first sheet size, such that an image center matches a sheet center in a main scanning direction and a sub-scanning direction, and store the determined setting value in the memory, and
   modify the setting value stored in the memory based on sheet information related to a second sheet to be used for printing, the second sheet having a second sheet size different from the first sheet size.

2. The image forming apparatus according to claim 1, wherein the sheet information indicates the second sheet size.

3. The image forming apparatus according to claim 1, wherein the sheet information indicates a difference between the first sheet size and the second sheet size.

4. The image forming apparatus according to claim 1, wherein
   the memory includes a first memory area for storing the sheet size information and a second memory area for storing the sheet information, and
   the processor acquires the sheet information from the second memory area of the memory.

5. The image forming apparatus according to claim 4, wherein
   at shipment of the image forming apparatus, the setting value stored in the memory is a pre-shipment setting value acquired through pre-shipment image position adjustment using a sheet of the first sheet size.

6. The image forming apparatus according to claim 5, wherein
   at the shipment of the image forming apparatus, the sheet information stored in the second memory area specifies the second sheet size, and
   the processor modifies the setting value during an initial setup of the image forming apparatus.

7. The image forming apparatus according to claim 6, wherein
   during the initial setup, the processor is further configured to update the sheet size information in the first memory area to specify the second sheet size.

8. The image forming apparatus according to claim 1, wherein
   the processor modifies the setting value based on a difference between the first sheet size and the second sheet size in the main scanning direction and the sub-scanning direction.

9. The image forming apparatus according to claim 1, wherein
   the setting value includes values to cause a margin on every sheet edge to be equal.

10. An operation method of an image forming apparatus including a scanner and a printer configured to print an image based on an image read by the scanner, the method comprising:
    controlling the printer to print an adjustment test pattern on a first sheet, and the scanner to scan the adjustment test pattern on the first sheet;
    determining a setting value for adjusting positioning of an image to be printed by the printer on a sheet of the first sheet size, such that an image center matches a sheet center in a main scanning direction and a sub-scanning direction, and storing the determined setting value in a memory; and
    modifying the setting value stored in the memory based on sheet information related to a second sheet to be used for printing, the second sheet having a second sheet size different from the first sheet size.

11. The operation method according to claim 10, wherein the sheet information indicates the second sheet size.

12. The operation method according to claim 10, wherein the sheet information indicates a difference between the first sheet size and the second sheet size.

13. The operation method according to claim 10, wherein the memory includes a first memory area for storing the sheet size information and a second memory area for storing the size of the sheet used for readjustment, and the sheet information is acquired from the second memory area of the memory.

14. The operation method according to claim 13, wherein at shipment of the image forming apparatus, the setting value stored in the memory is a pre-shipment setting value acquired through pre-shipment image position adjustment using a sheet of the first sheet size.

15. The operation method according to claim 14, wherein at the shipment of the image forming apparatus, the sheet information stored in the second memory area specifies the second sheet size, and the setting value is modified during an initial setup of the image forming apparatus.

16. The operation method according to claim 15, further comprising:
during the initial setup, updating the sheet size information in the first memory area to specify the second sheet size.

17. The operation method according to claim 10, wherein the setting value is modified based on a difference between the first sheet size and the second sheet size in a main scanning direction and a sub-scanning direction.

18. The operation method according to claim 10, wherein the setting value includes values to cause a margin on every sheet edge to be equal.

* * * * *